Oct. 24, 1967  C. J. CASEY  3,348,835
PNEUMATIC SHOCK ABSORBER
Filed June 1, 1965  2 Sheets-Sheet 1
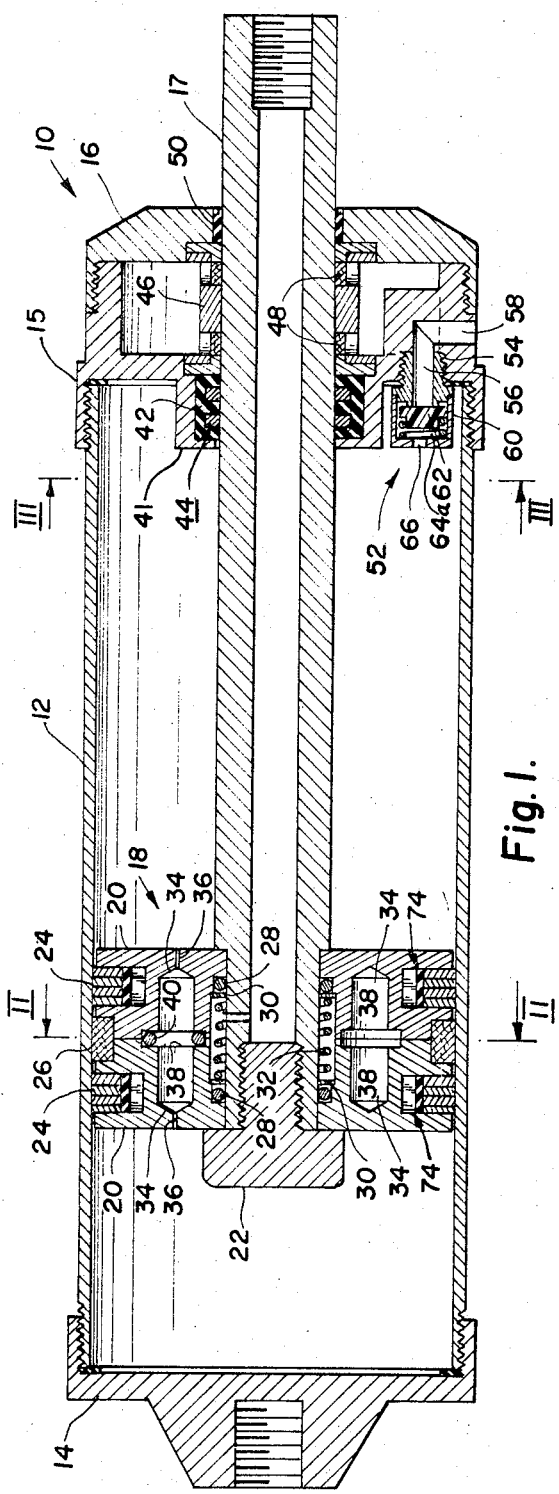
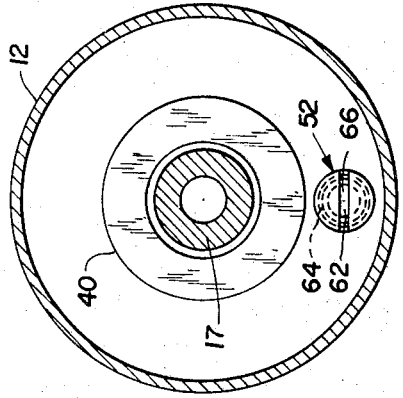
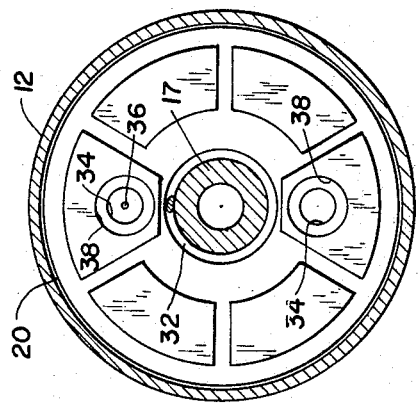
INVENTOR.
CHARLES J. CASEY
BY
*William J. Ruano*
his ATTORNEY Oct. 24, 1967  C. J. CASEY  3,348,835
PNEUMATIC SHOCK ABSORBER
Filed June 1, 1965  2 Sheets-Sheet 2

INVENTOR.
CHARLES J. CASEY
BY
*William J. Ruano*
his ATTORNEY

United States Patent Office 3,348,835
Patented Oct. 24, 1967

3,348,835
PNEUMATIC SHOCK ABSORBER
Charles J. Casey, 613 Mt. Pleasant Road,
Pittsburgh, Pa. 15214
Filed June 1, 1965, Ser. No. 460,143
10 Claims. (Cl. 267—65)

ABSTRACT OF THE DISCLOSURE

This invention relates to a pneumatic shock absorber which introduces an increasing amount of air pressure into the cylinder by means of a vacuum operated check valve, until a predetermined air cushion is provided.

---

This invention relates to a pneumatic shock absorber for use in a vehicle spring suspension.

An outstanding disadvantage of conventionally used hydraulic shock absorbers in vehicle spring suspensions is that while satisfactory cushioning is provided against shocks from chuck holes or obstructions in the road at ordinary relative speeds of movement between the axle and chassis, abnormally high resistance develops at high relative speeds, causing transmission of very disturbing shocks to the chassis and body.

While pneumatic shock absorbers have been used, these generally have been somewhat complicated in construction and some have required occasional re-filling of air under pressure at service stations in order to remain operative.

An object of the present invention is to provide a novel pneumatic shock absorber which is devoid of the above-named disadvantages of conventional shock absorbers and which will provide air cushioning of shocks irrespective of load conditions so as to always give a relatively soft ride.

A more specific object of the present invention is to provide a pneumatic shock absorber for use with a vehicle spring suspension for the purpose of providing an air cushion which will progressively increase in pressure as the result of successive relative movements between the axle and vehicle chassis so as to give a comfortable ride.

A further object of the invention is to provide a pneumatic shock absorber for vehicles, and the like, which shock absorber has a novel seal assembly and a novel lubricating construction which provide an amazing increase in life over conventional shock absorbers.

Other objects and advantages will become more apparent from a study of the following description taken with the accompanying drawings wherein:

FIG. 1 is a longitudinal, cross-sectional view of a pneumatic shock absorber embodying the principles of the present invention;

FIG. 2 is a cross-sectional view taken along line II—II of FIG. 1;

FIG. 3 is a cross-sectional view taken along line III—III of FIG. 1;

Figure 4:
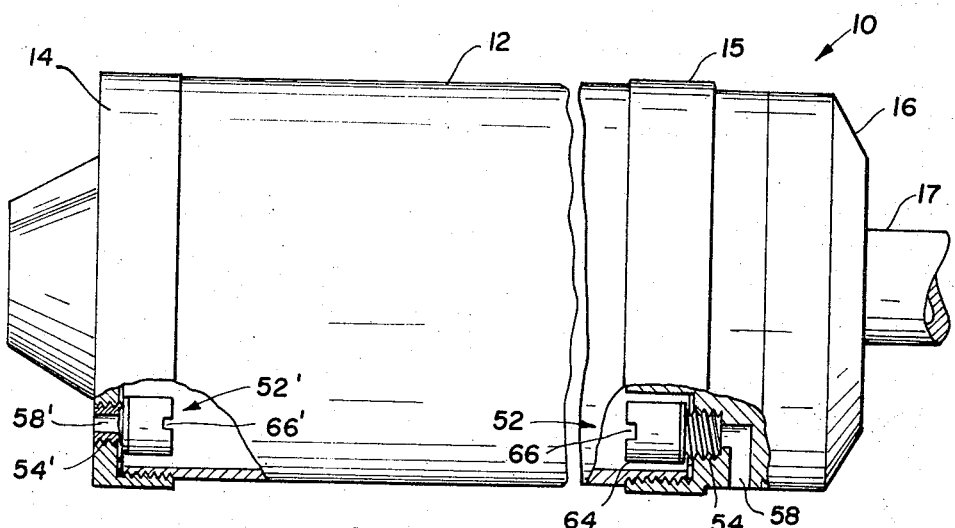
FIG. 4 is a side view, with parts broken away, of a modification of the pneumatic shock absorber, showing the use of two check valves, instead of one.

Referring more particularly to FIGS. 1, 2 and 3 of the drawing, numeral 12 denotes a cylinder having screw threaded, on one end, a cap 14 which has a screw threaded well into which a rod or eye (not shown) may be screw threaded for attaching the cap to the axle. At the other end of the cylinder, a cap 15 is screw threaded which is provided with a well portion for receiving lubricant, which well portion is covered by a second cap 16 screw threaded to cap 15.

Axially of cylinder 12, there is slidably mounted a shaft 17 which is hollow so as to receive grease for supplying lubricant through the radial passages shown in FIG. 2 to the piston rings 24. To the free end of shaft 17, there may be screw threaded either an eye or rod for attachment to the chassis of the vehicle (not shown).

The piston, denoted generally by numeral 18, comprises two separate matching halves or parts 20, 20 which are held together by a threaded cap screw 22 screw threaded to an internally threaded end portion of the hollow shaft 17. A plurality of registering, substantially cylindrical cavities 38 are provided, each of which is sealed by a sealing ring 40 of rubber or other suitable deformable sealing material so as to prevent entry of grease into cavities 38. At the other ends of the cavities 38, there are provided vent openings or orifices 36 to permit the passage of air from one side of the piston to the other. The size of the orifice or vent opening will vary according to loading conditions and other factors. In certain situations, for a soft ride, this vent may be .03 inch in diameter; for medium rides, .025 inch in diameter; and for comparatively hard rides, .02 inch. An opening need not be made on both sides of the piston, as shown, since one will suffice, providing the other opening is fairly large, say 1/16 inch diameter. In order to assure registry of the two halves 20, 20 of the piston, a pin or dowel may be closely fitted into the lower set of cavities 38 so as to fill the cavity spaces and provide piston alignment.

Figure 7:
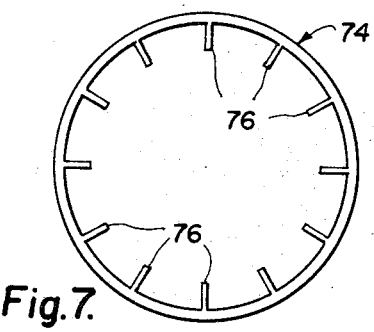
FIG. 7 is a plan view of the expander 74; and,
FIG. 8 is a plan view of the seal ring 44.

At the outer end of the piston there are mounted split piston rings 24 made of a suitable, long wearing material, such as nylon impregnated with molybdenum sulphide, sold under the trademark Nylatron. Expanders 74 (see FIG. 7) are inserted under compression so as to urge rings 24 radially outwardly. Expanders 74 are of homogeneous rubber of predetermined durometer to maintain a constant outward pressure on the compression rings 24. Radially inwardly extending integral extensions 76 (see FIG. 7) are seated in the well portion.

A felt strip 26 of prescribed density is fitted into and about a circular well portion formed in the confronting faces of the two cylinder halves 20, 20 to form a grease seal and by means of saturation, delivers a thin film of lubricant on the cylinder wall. Sealing rings 28 and seal retainers 30 are provided and held in place by a spring 32. The space occupied by the spring 32 is supplied with grease through a radial orifice leading from the hollow portion of shaft 17.

Figure 8:
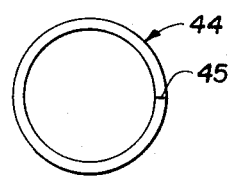

At the other end of the shock absorber, there is provided, integrally with cap 15, a collar portion 41 forming a well which contains a rubber ring 42, under tension, with peripheral grooves on the inner surface which enclose split sealing rings 44 (see FIG. 8) split at 45 and which may be made of the same material as piston rings 24. Constant compression is exerted by rubber ring 42 on rings 44 insuring a good seal and long life. A bushing 46 is positioned next to the sealing rings 44 and which is encircled by two felt washers 48 for providing a lubricated fit with the outer surface of shaft 17. An Alemite or other suitable grease retaining fitting (not shown) may be provided on cap 16 to supply the interior with grease to lubricate felt washers 48. A sealing ring 50 is provided between cap 16 and shaft 17 to prevent loss of lubricant. The above described sealing construction enables very effective lubrication of the outer surface of shaft 17 eliminating excessive wear of parts or loss of grease, thereby providing very long life to the shock absorber.

A one-way check valve, denoted generally by numeral 52, is provided between the outside of the cylinder 12 and the inside thereof to permit air to enter the cylinder when the piston moves to the left, as in FIG. 1, to effect compression of the vehicle spring. The one-way check valve comprises a body member 54 screw threaded to a portion of cap 15 with a hole 56 communicating with an inlet opening 58. The valve comprises a plastic disc 62 normally seated or held in the closed position by spring 64a contained within a housing 64. Such housing has an air inlet opening 66 and kerf to enable screwing of the entire valve unit by a screw driver.

In operation, assuming that cap 14 is attached to the axle and that shaft 17 is attached to the vehicle chassis. When an obstruction is encountered on the roadway, causing compression of the vehicle springs, shaft 17 will move to the left relative to cylinder 12 causing air to be compressed in the left side of the cylinder and effecting a partial vacuum in the right side of the cylinder. As a consequence of such partial vacuum, valve disc 62 will become unseated by being drawn against the action of the return spring 64, thereby admitting air through passages 58, 56 and 66 into the right side of the piston 18. Then as rebound movement occurs, shaft 17 will move to the right, thereby compressing the air in the right side of the piston 18, causing check valve 52 to close and thus cushioning the movement of the piston 18 by compressed air during rebound movement. At the same time, air will gradually seep through orifices 34 and 36 and thus slowly flow from the right to the left side of piston 18. Then as the vehicle spring is again compressed, causing shaft 17 to move to the left, air in the left side of the cylinder will become compressed to a higher pressure compared to the first compression stroke and at the same time, by virtue of the vacuum created on the right side of the piston, check valve 52 will again open, admitting an additional amount of air into the cylinder. Then as a consequence of a second rebound of the vehicle spring, shaft 17 will move to the right, which movement will be resisted to a greater extent than the previous rebound movement because of the greater density of air at the right of the cylinder. Since no outlet valve is provided at either end of the cylinder, it will be readily seen that with each movement of the piston to the left, a progressively greater amount of air is admitted into the cylinder, and with each movement to the right, an increase in air pressure is provided until finally the air cushioning pressure becomes so great that there will be very little relative movement between shaft 17 and cylinder 12 at which time no additional air is introduced into the cylinder. Considering a calibration of zero air pressure for normal atmospheric condition, pressures up to an additional 15 lbs. per square inch or even more are developed within the cylinder.

FIG. 4 shows a modification which is similar in all respects to the construction shown in FIG. 1 except that an additional one-way check valve 52′ is provided in cap 14 so that air may be admitted through inlet orifice 58′, and a kerf 66′ is provided to enable screwing or unscrewing of the check valve unit. In operation, instead of admitting air only during the compression or spring loading stroke, that is, when piston 18 moves to the left, air is also admitted through inlet 58′ as the piston moves to the right. In other words, additional increments of air are introduced through the respective one-way check valves 52 and 52′ as the piston moves to the left or right, respectively.

Figure 5:
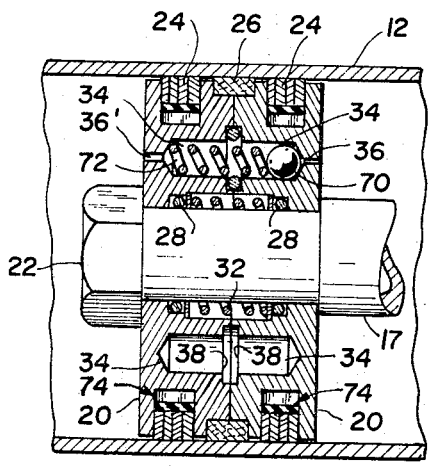
FIG. 5 is a fragmentary, longitudinal, cross-sectional view of a further modified form of piston with one check valve.

FIG. 5 shows a modification of the piston wherein the parts are the same as those described in connection with FIG. 1 except that an additional one-way acting ball check valve 24 is provided, which, by the action of spring 72, will normally become seated so as to close orifice 36 and allow air to be compressed at the left of the piston. Spring 72 is of a prescribed tension so as to allow unseating of the ball at a predetermined pressure. However, when the piston moves to the right, the pressure created in the right side of the piston will effect unseating of the ball check valve 34, allowing air to enter port 36′ and travel through the further constricted port 36, to the right side of the piston. Port 36 may be of the order of .035 inch in diameter, whereas port 36′ may be larger, such as 1/16 inch in diameter.

Figure 6:
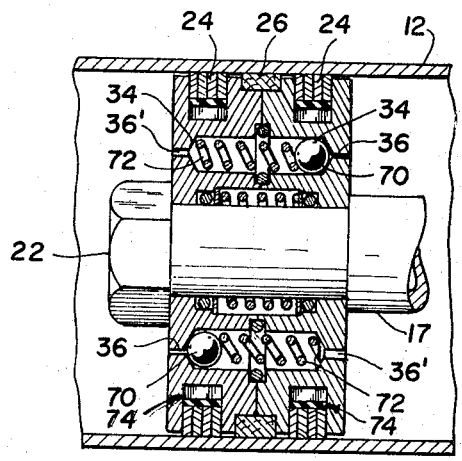
FIG. 6 is a fragmentary, longitudinal, cross-sectional view of a further modified form of piston with two check valves.

FIG. 6 shows a still further modification of the piston which embodies a two-way check valve assembly comprising a ball 34 normally seated by return spring 72 so as to close port 36, and a second ball 70 which is normally held seated by return spring 72. The opening 36′ may be 1/16 inch and the opening 36 may be .035 inch to afford the necessary cushioning on the downstroke or compression stroke of the vehicle spring. The orifice 36′ may be .025 inch in diameter to provide the necessary cushioning on rebound. In operation, as the piston moves to the right, ball 34 becomes unseated allowing air to flow from the right to the left of the piston. As the piston moves to the left, ball 70 becomes unseated to allow air to move from the left to the right of the piston.

Thus it will be seen that I have provided a highly efficient, pneumatic shock absorber that provides progressive increases in pneumatic cushioning as the result of successive compression and rebound strokes until maximum compression develops to afford high cushioning pressure to retard relative movement between the piston and cylinder so as to provide optimum cushioning of even abnormal shocks instead of transmitting them to the vehicle, thereby giving a relatively soft or smooth ride, even on very bumpy roads; furthermore, I have provided a pneumatic shock absorber made of relatively simple and exchangeable parts adapted to be manufactured inexpensively and assembled easily and quickly in a foolproof manner, and, at the same time, providing highly efficient lubrication and highly efficient sealing to prevent escape of the lubricant, whereby the life of the shock absorber is increased by many fold over the average life of ordinary shock absorbers; furthermore, I have provided a pneumatic shock absorber that requires no refilling with air under pressure, but which is self-filling and which admits an optimum amount of air as the result of compression and rebound strokes so as to give a very soft and comfortable ride, irrespective of bumpy road conditions.

While I have illustrated and described several embodiments of my invention, it will be understood that these are by way of illustration only, and that various changes and modifications may be made within the contemplation of my invention and within the scope of the following claims.

I claim:

1. A vehicle shock absorber comprising a cylinder for attachment to a vehicle axle and a piston therein for attachment to a vehicle chassis, said piston containing a small orifice for permitting air to flow from one side of the piston to the other in said cylinder, and a one-way check valve for admitting air in one side of the cylinder only during compression of the vehicle spring and which is closed as the result of rebound movement and travel of the piston in an opposite direction, there being no other openings to the atmosphere in said cylinder, whereby the air pressure therein will progressively increase as the result of reciprocation of the piston until the compressive forces diminish to a point where they no longer activate said check valve.

2. A shock absorber for supplementing a vehicle spring suspension and comprising a cylinder having a cap on one end for attachment to the axle, a piston in said cylinder and containing a small orifice for restricted flow of air from one side to the other of said piston, and a cap at the other end of the cylinder for slidably supporting a piston rod, said second cap having mounted therein a one-way check valve for admitting air as a consequence of movement of said piston toward said first mentioned cap and which will close as the result of movement of said piston toward said second said cap, there being no other openings to the outside atmosphere in said cylinder, whereby air is progressively increased in pressure in said cylinder on both sides of the piston as a consequence of reciprocation of the piston in the cylinder until the compressive forces diminish to a point where they no longer activate said check valve.

3. A shock absorber as recited in claim 2 wherein said piston comprises two separate halves having confronting wells for providing interior cavities which communicate with opposite sides of the piston, said orifice extending through the closed ends of said wells.

4. A vehicle shock absorber as recited in claim 2 wherein said second cap is provided with a well containing a stack of split sealing rings telescopically fitted on the piston rod, a bushing surrounded by felt washers immediately adjacent said rings and also telescopically fitted on the piston rod, and a third cap attached to said second cap to form a reservoir surrounding said bushing and which is filled with lubricant.

5. A pneumatic shock absorber as recited in claim 2 wherein said piston rod is hollow and provided with a radial opening for supplying grease to said piston rings.

6. A vehicle shock absorber as recited in claim 2 wherein said piston contains a spring closed, ball check valve for normally closing said orifice when the piston moves in one direction, and for allowing air to flow from one side of the piston to the other when the piston moves in an opposite direction.

7. A vehicle shock absorber as recited in claim 2 wherein said piston is provided with two check valves, one for normally closing said orifice for allowing restricted flow of air from one side of the piston to the other as the piston moves in one direction, and the other check for closing a second restricted port in said piston as the result of movement of the piston in an opposite direction.

8. A vehicle shock absorber as recited in claim 2 wherein said last mentioned cap contains a well surrounding said piston rod, sealing rings contained in said well and snugly embracing said piston rod, and a rubber ring under tension having circumferential grooves on the inner surface thereof containing said sealing rings and maintaining constant radially inward pressure on said sealing rings so as to continuously contact said piston rod.

9. A vehicle shock absorber as recited in claim 2 wherein said last mentioned cap contains a well surrounding said piston rod, sealing rings contained in said well and snugly embracing said piston rod, and a rubber ring under tension having circumferential grooves on the inner surface thereof containing said sealing rings and maintaining constant radially inward pressure on said sealing rings so as to continuously contact said piston rod, said piston comprising two separate halves of circular shape fastened together, each half having a peripheral groove containing a stack of split sealing rings, and a rubber expanding ring under tension contained in each peripheral groove for yieldingly and continuously urging said split sealing rings in constant contact with the cylinder wall.

10. A shock absorber as recited in claim 9 wherein said expanding ring is provided with spaced, radially inwardly projecting, integral extensions whose ends are seated in said peripheral grooves.

References Cited

UNITED STATES PATENTS 2,833,379   5/1958   Matthews et al. _____ 267—65

ARTHUR L. LA POINT, *Primary Examiner.*

R. M. WOHLFARTH, *Assistant Examiner.*